United States Patent
Fialho et al.

(10) Patent No.: US 9,409,181 B2
(45) Date of Patent: Aug. 9, 2016

(54) DEVICE FOR COMMINUTING FEEDSTOCK

(75) Inventors: Augusto Fialho, Nazare (PT);
Karlheinz Herbold, Edingen (DE)

(73) Assignee: Herbold Meckesheim GmbH,
Meckesheim (DE)

( * ) Notice: Subject to any disclaimer, the term of this patent is extended or adjusted under 35 U.S.C. 154(b) by 145 days.

(21) Appl. No.: 14/115,745

(22) PCT Filed: Apr. 25, 2012

(86) PCT No.: PCT/DE2012/200030
§ 371 (c)(1),
(2), (4) Date: Nov. 5, 2013

(87) PCT Pub. No.: WO2012/149932
PCT Pub. Date: Nov. 8, 2012

(65) Prior Publication Data
US 2015/0060585 A1    Mar. 5, 2015

(30) Foreign Application Priority Data

May 5, 2011   (DE) .......................... 10 2011 100 646
Nov. 21, 2011 (DE) .......................... 10 2011 086 693

(51) Int. Cl.
*B02C 18/02*   (2006.01)
*B02C 18/22*   (2006.01)

(52) U.S. Cl.
CPC ............ *B02C 18/02* (2013.01); *B02C 18/2233* (2013.01)

(58) Field of Classification Search
CPC .......................... B02C 18/02; B02C 18/2233
USPC .................................. 241/282, 265, 283, 224
See application file for complete search history.

(56) References Cited

U.S. PATENT DOCUMENTS

| 3,380,502 A * | 4/1968 | Gronberg ...................... 241/224 |
| 4,165,045 A * | 8/1979 | Hager et al. .................. 241/282 |
| 5,078,327 A   | 1/1992 | Kemetter |
| 8,210,457 B2  | 7/2012 | Takakura |

FOREIGN PATENT DOCUMENTS

| CN | 2728620 Y   | 9/2005 |
| CN | 201275825 Y | 7/2009 |
| CN | 101801533 A | 8/2010 |
| CN | 201720101 U | 1/2011 |
| DE |   510547 C  * 10/1930 |

(Continued)

OTHER PUBLICATIONS

Foreign Patent and English Translation Included as DE510547C_for.pdf.*
State Intellectual Property Office of the P.R.C., Notice of First Office Action for Application No. 20128031227.1, Aug. 27, 2014, 15 pages, China.

(Continued)

*Primary Examiner* — Mark Rosenbaum
(74) *Attorney, Agent, or Firm* — Alston & Bird LLP

(57) ABSTRACT

The invention relates to a device for comminuting feedstock (1) of any type, in particular made of plastic, preferably of PE, comprising a feeding apparatus and a comminuting apparatus (6), wherein the feeding apparatus (2) comprises a trough (3) to receive the feedstock (1) and conveying means (4) for conveying the feedstock (1) to the comminuting device (6) or into the comminuting device (6), and wherein the comminuting device (6) comprises a planar tool holder (9) equipped with tools (10), in particular cutting tools, on its operating side, characterized in that the tool holder (9) performs an oscillating motion relative to the feedstock (1).

10 Claims, 2 Drawing Sheets

(56) References Cited

FOREIGN PATENT DOCUMENTS

Figure 1:
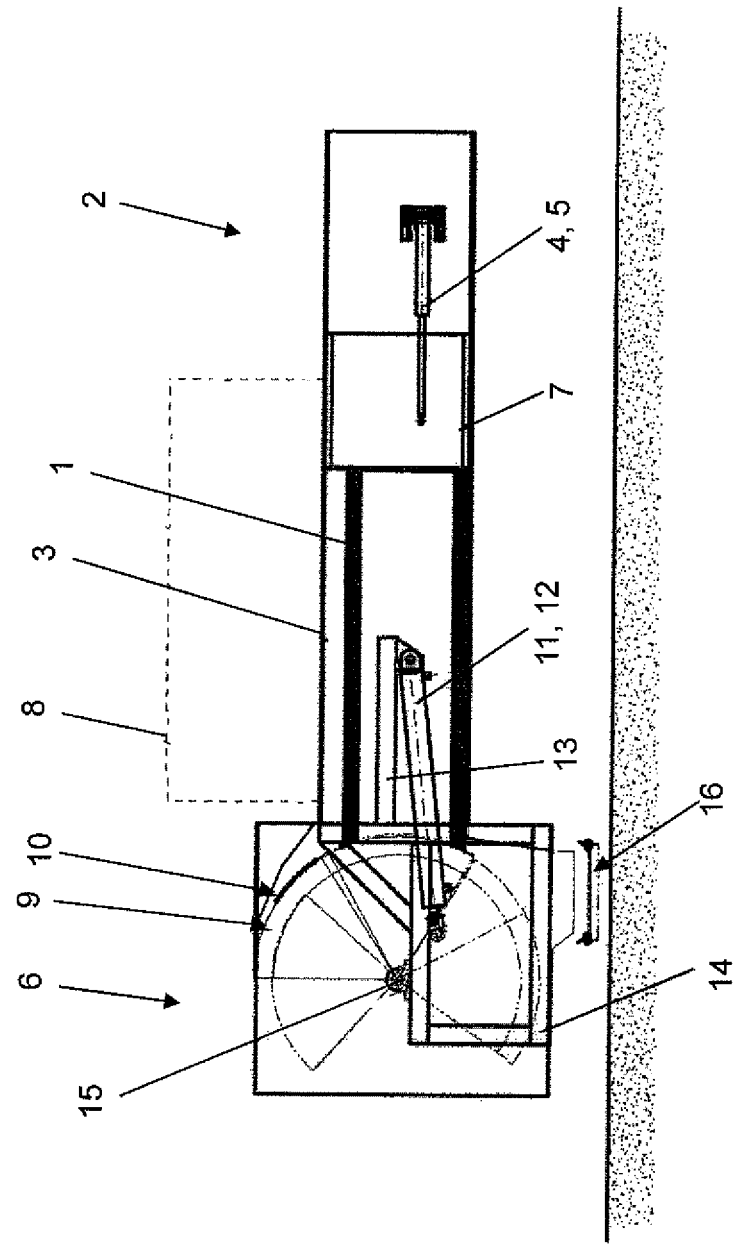

| DE | 510547 | C1 | 10/1930 |
|---|---|---|---|
| DE | 2420913 | A1 | 11/1975 |
| DE | 2542908 | | 3/1977 |
| DE | 4316325 | A1 | 11/1994 |
| DE | 102004004206 | A1 | 8/2005 |
| DE | 202010007143 | U1 | 9/2010 |
| GB | 1546690 | A | 5/1979 |

OTHER PUBLICATIONS

International Searching Authority, International Search Report (ISR) and Written Opinion for International Application No. PCT/DE2012/200030, mailed Oct. 26, 2012, 10 pages, European Patent Office, The Netherlands, and Germany, respectively.

The International Bureau of WIPO, International Preliminary Report on Patentability (English translation of the Written Opinion) for International Application No. PCT/DE2012/200030, mailed Nov. 14, 2013, 6 pages, Switzerland.

* cited by examiner

DEVICE FOR COMMINUTING FEEDSTOCK

CROSS REFERENCE TO RELATED APPLICATIONS

This application is a national stage application, filed under 35 U.S.C. §371, of International Application No. PCT/DE2012/200030, filed Apr. 25, 2012, which claims priority to German Application No. 10 2011 100 646.3, filed May 5, 2011 and German Application No. 10 2011 086 693.0 filed Nov. 21, 2011, the contents of all of which are hereby incorporated by reference in their entirety.

BACKGROUND

1. Technical Field

The invention relates to a device for comminuting feedstock of any type, in particular made of plastic, preferably of PE, comprising a feeding apparatus and a comminuting device, wherein the feeding apparatus comprises a trough to receive the feedstock and conveying means for conveying the feedstock to the comminuting device or into the comminuting device and wherein the comminuting device comprises a planar tool holder equipped with tools, in particular cutting tools, on its operating side.

In general, the invention relates to the comminuting of feedstock of any type, whereby this can concern feedstock made of plastic, paper, cardboard, etc. The feedstock can in turn be rejects associated with the manufacture of plastic, for instance long plastic tubes with diameters that by far exceed one meter, which are disposed of, specifically recycled because of production-related errors. As well, it can concern rough-pressed feedstock in the form of baled materials made of different types of materials. The device is supposed to be suitable for comminuting large-size, bulky feedstock, in particular tough feedstock made of polyethylene.

2. Description of Related Art

Different types of embodiments of devices conforming to their genre have been disclosed in the prior art. As an example, reference is made to DE 10 2004 004 206 A1. This printed document illustrates a device for comminuting preferably oblong feedstock, wherein this can concern long tubes with an insignificant diameter. The device comprises a feeding apparatus in the shape of a trough which the feedstock is placed into. The feedstock is conveyed to a comminuting device comprising a tool holder which in turn is equipped with cutting tools. The tool holder disclosed in DE 10 2004 004 206 A1 is a rotationally symmetric component which turns with a relatively high rotational speed, with up to 200 rotations per minute. If the type-defining device is to be used for comminuting tubes with considerable diameters, it is necessary to provide a tool holder with an adequately sized diameter to match the diameter of the tubes. As the tool holders and tools used there are precision parts, which on top of that require balancing because of the high rotational speed, the size or diameter of the tool holder means a considerable constructional expense and thus high manufacturing costs.

BRIEF SUMMARY

The object of the present invention therefore is to design and upgrade the type-defining device for comminuting feedstock such that it is equally suitable for comminuting feedstock with a considerable diameter, for example tubes with a diameter greater than one meter. Moreover, it should be possible to comminute feedstock in the form of bales, in particular made of ductile materials such as polyethylene. The device should have a simple design, be easy to handle and hence be economical to manufacture.

The objective mentioned above is solved with a device having the characteristics of patent claim 1. Accordingly, the type-defining device is characterized in that the tool holder performs an oscillating motion relative to the feedstock.

Based on the invention, it was determined that it is not necessary to design the tool holder with the tools attached thereon rotationally symmetrical to rotating motions. In fact, the technique established in the prior art according to which the comminuting must be achieved by means of rotationally symmetrical tool holders is abandoned. Based on the invention, any geometries of a tool holder are conceivable, especially because the tool holder performs an oscillating motion, i.e. a reciprocating motion, relative to the feedstock. This makes it possible that the tool holder acts within the meaning of a rasp and in so doing can have a smaller surface area than the cross-sectional area of the feedstock to be conveyed into the comminuting device. Said type of device according to the invention is ideal for comminuting plastic tubes with large diameters or rough-pressed plastic bales, namely for literally rasping them to small pieces with the oscillating tool holder and the tools provided there, wherein the tool holder can be a rough component far from having a precise design of the rotating tool holders disclosed in the prior art.

We would like to take this opportunity to add that "oscillating motion" means any reciprocating motion, irrespective of the movement pattern and frequency. Consequently, the tool holder is neither a rotating disk nor a rotating barrel or similar. In fact, not even a rotationally symmetrical body is required. In contrast, the tool holder can be a simple plate with considerable process tolerances, for example a type of a frontal plate or a sector segment. The tools attached on the tool holder are moved back and forth by the tool holder, wherein the feedstock to be comminuted is conveyed against the tool holder and consequently against the tools and pushed in the process.

Based on the oscillating motion of the tool holder, the feedstock material is literally rasped, to the extent possible in both moving directions of the tool holder. Accordingly, it is of considerable advantage, if the tool holder comprises tools acting in both moving directions. In so doing, they can be tools which—per se—based on their tool-specific design are able to cut both in the one as well as the other direction. Likewise, the tools can be arranged and oriented such that they—each considered separately—only act in one movement direction, but that about half of them are oriented in one and half are oriented in the other movement direction. Any arrangements of the tools on the tool holder are conceivable.

Advantageously, the tools are arranged replaceable on or in the tool holder, wherein it is recommended that the tools are screwed down on the tool holder.

The oscillating motion of the tool holder relative to the feedstock is relevant for the invention, wherein this relates to a reciprocating motion defined in any way, namely in contrast to a rotating motion of the tool holder according to the prior art. In so doing, it is advantageous if the tool holder is arranged essentially diagonally or transversally movable to the feeding apparatus of the feedstock, wherein it is again advantageous if the feedstock is conveyed within a trough-like feeding apparatus and retained opposite the comminuting device.

In the simplest case, the tool holder can be a plain or flat plate which oscillates in one plane. Insofar, the tool holder with the tools attached thereon acts within the meaning of a rasp. As well, it is conceivable that the tool holder designed as a plate performs a type of reciprocating motion, namely in the event that the tool holder is only supposed to cut or rasp the feedstock in one direction, for example aimed downward. This type of design would have the advantage that the feedstock is propped up against the bottom of the trough and the lifting off of the feedstock within the trough is effectively prevented. However, a cutting motion in both movement directions increases the throughput and is insofar preferable, wherein in this case the trough would have to be closed or even equipped with a pressure pad for the feedstock.

If the tool holder is a plain or flat plate, it can oscillate in one plane such that the simplest of drives with the simplest guidance of the tool holder can be realized, as a result of which the costs of the device are again reduced considerably. It should be mentioned here that the tool holder can be a retainer for tools with any geometry, wherein it is relevant that the tool holder performs an oscillating, rather than a rotating motion relative to the feedstock. Thus, it is conceivable that the tool holder is designed as barrel surface segment and oscillates or is swiveled around a swiveling axis.

Irrespective of the actual design of the tool holder, the latter can be driven pneumatically or hydraulically by way of a simple lever arrangement and/or by way of at least one cylindrical piston unit, due to its oscillating motion relative to the feedstock. In particular for comminuting ductile materials, for example for comminuting tubes made of polyethylene, it is conceivable that the tool holder is driven with 2 to 10 strokes per minute, i.e., with an extremely low frequency. This reduces the expenses with respect to an adequate guidance of the tool holder.

Advantageously, the tool holder operates against a stationary bedknife with a shearing or cutting effect relative to the feedstock, such that the comminuting of the feedstock is likewise assisted insofar. A collection tank and/or a conveying apparatus for the comminuted parts are advantageously provided in the area below the tool holder. From there, the comminuted feedstock can be conveyed to a subsequent recycling process or to an interim storage location.

A number of different options are available to advantageously design and upgrade the teaching of the present invention. For this purpose, reference is made to the subordinate patent claims of claim 1 on the one hand and to the following explanation of two preferred exemplary embodiments of the invention based on the drawing on the other hand. Generally preferred embodiments and upgrades of the teaching are likewise explained in connection with the explanation of the preferred exemplary embodiments of the invention based on the drawing. In the figures

DETAILED DESCRIPTION OF THE DRAWINGS

Figure 2:
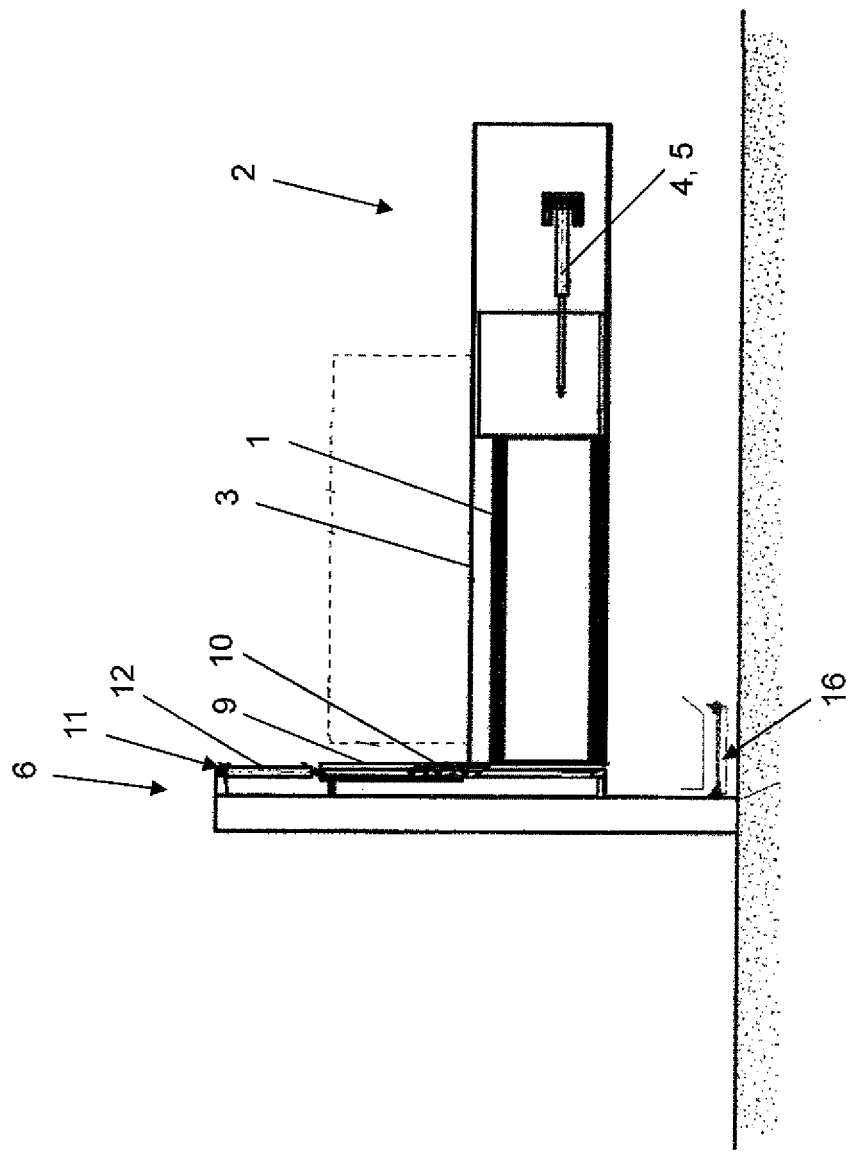

FIG. 1 shows a schematic side view of a first exemplary embodiment of the device according to the invention, in which the tool holder is designed as an oscillating barrel surface segment, and FIG. 2 shows a schematic side view of a second exemplary embodiment of a device according to the invention, wherein the tool holder is designed as a plate having a linear guide for performing a reciprocating motion.

DETAILED DESCRIPTION OF VARIOUS EMBODIMENTS

FIG. 1 shows a first exemplary embodiment of a device according to the invention for comminuting feedstock of any type, wherein this specifically relates to a device for comminuting long PE tubes 1 with a considerable diameter. The device comprises a feeding apparatus 2, which essentially consists of a trough 3 to receive the tube 1 to be comminuted. Conveying means 4 used to convey the feedstock or the tube 1 in the direction of a comminuting device 6 are provided within the trough 3. The conveying means 4 comprise a cylindrical piston unit 5, by way of which a sliding element 7 acts on the tube 1, moving it in the direction toward the comminuting device 6.

The tube 1 is placed in the trough 3 or in a conveying channel formed by the trough 3, wherein the trough 3 can be covered with a lid 8. In addition to its actual closing function, the lid 8 can have a holding down function acting on the tube 1.

The comminuting device 6 comprises a tool holder 9 in the shape of a barrel surface segment having a swiveling support for performing the reciprocating motion. The tool holder 9 is equipped with tools 10. The tool holder 9 is driven by an activation apparatus 11, wherein this can be a cylindrical piston unit 12 in addition to a lever arrangement 13. The relevant aspect for the design of the exemplary embodiment according to FIG. 1 is that the tool holder 9 performs an oscillating rather than a rotating motion, wherein the tool holder 9 is supported on a frame 14 and performs a reciprocating cutting or rasping motion along the tube 1, namely within the meaning of a pendulum.

A collection tank 16 for the comminuted materials which serves for the collection and removal of the comminuted materials is provided in the area where the cuts are made.

With respect to the reciprocating motion of the tool holder 9, we would like to mention that it can have any design, wherein imbalances are irrelevant for lack of a rotating motion and because the frequency is only low. Considerable process tolerances are acceptable.

FIG. 2 shows an additional—simple—exemplary embodiment of a device according to the invention, wherein the feeding apparatus 2 with the trough 3 provided therein and the conveying means 4 including the cylindrical piston unit 5 are designed in accordance with the embodiment according to FIG. 1.

Compared to the exemplary embodiment of FIG. 1, the exemplary embodiment of FIG. 2 differs in the comminuting device 6, wherein the tool holder 9 there is designed as a plate, which carries the tools 10. The plate is guided in a frame for performing a reciprocating motion by way of a cylindrical piston unit 12, wherein the tool holder 9 with its tools 10 performs a cutting or rasping motion relative to the tube 1 to be comminuted.

A collecting tank 16 used to collect and remove the comminuted feedstock is again provided below the area where the cuts are made.

Compared to the exemplary embodiment of FIG. 1, the exemplary embodiment illustrated in FIG. 2 is a simple device which can be realized economically. Since the tool holder 9 is only a plate with tools 10 attached thereon, the plate can on the one hand be guided with simple means, for example within vertical frame parts, and be operated in a simple fashion by way of a cylindrical piston unit 12.

With respect to other advantageous embodiments of the device according to the invention, reference is made to the general part of the description as well as the enclosed patent claims to avoid repetitions.

Finally, it is expressly pointed out that the exemplary embodiments of the device according to the invention described above only serve the purpose of discussing the claimed teaching, without limiting it to the exemplary embodiments.

REFERENCE LIST

1 PE tube, feedstock
2 Feeding apparatus
3 Trough
4 Conveying means
5 Cylindrical piston unit (of 4)
6 Comminuting device
7 Sliding element
8 Lid
9 Tool holder
10 Tool
11 Activation apparatus (of the tool holder)
12 Cylindrical piston unit (of 11)
13 Lever arrangement
14 Frame
15 Swiveling axis
16 Collection tank

The invention claimed is:

1. A device for comminuting feedstock made of plastic, the device comprising:
   a feeding apparatus; and
   a comminuting device,
   wherein:
      the feeding apparatus comprises a trough to receive the plastic feedstock and conveying means for conveying the plastic feedstock to the comminuting device or into the comminuting device, the conveying means comprising a cylindrical piston unit, through which a sliding element acts on the plastic feedstock and in so doing moves the plastic feedstock within the trough in the direction toward the comminuting device;
      the comminuting device comprises a tool holder equipped with tools positioned on the operating side of the tool holder; and
      the tool holder is configured to perform an oscillating motion relative to the plastic feedstock; and
      the tool holder has a barrel surface segment, which reciprocates in a cutting or rasping motion at the plastic feedstock.

2. A device according to claim 1, wherein the feedstock is made of polyethylene.

3. A device according to claim 1, wherein the tools comprise cutting tools.

4. A device according to claim 1, wherein the tool holder comprises tools that act in both moving directions of the tool holder.

5. A device according to claim 1, wherein the tools are replaceable.

6. A device according to claim 1, wherein the tool holder is arranged at least one of diagonally or transversally movable relative to the direction the feedstock is moved by the cylindrical piston unit of the conveying means.

7. A device according to claim 1, wherein the tool holder is configured to be driven at least one of pneumatically or hydraulically by way of at least one of a lever arrangement or at least one cylindrical piston unit.

8. A device according to claim 1, wherein the tool holder is configured to be driven to perform an oscillating motion with 2 to 10 strokes per minute.

9. A device according to claim 1, wherein at least one of collection tank or a conveying apparatus for the comminuted parts is provided in the area below the tool holder.

10. A device according to claim 1, wherein the tool holder operates against a stationary bedknife with at least one of a shearing or a cutting effect relative to the feedstock.

* * * * *